Figure 3:
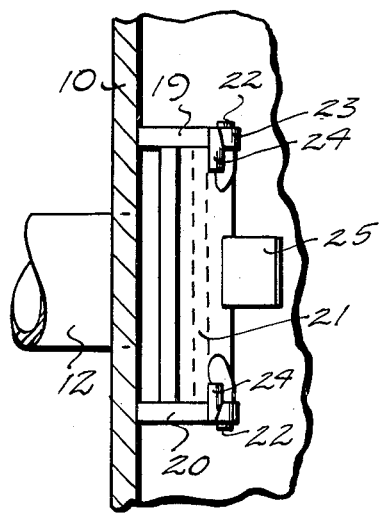

Oct. 13, 1936.   J. P. WALKER   2,057,257
METHOD OF AND MEANS FOR SEPARATING FLUIDS
Filed Oct. 23, 1933   3 Sheets-Sheet 1
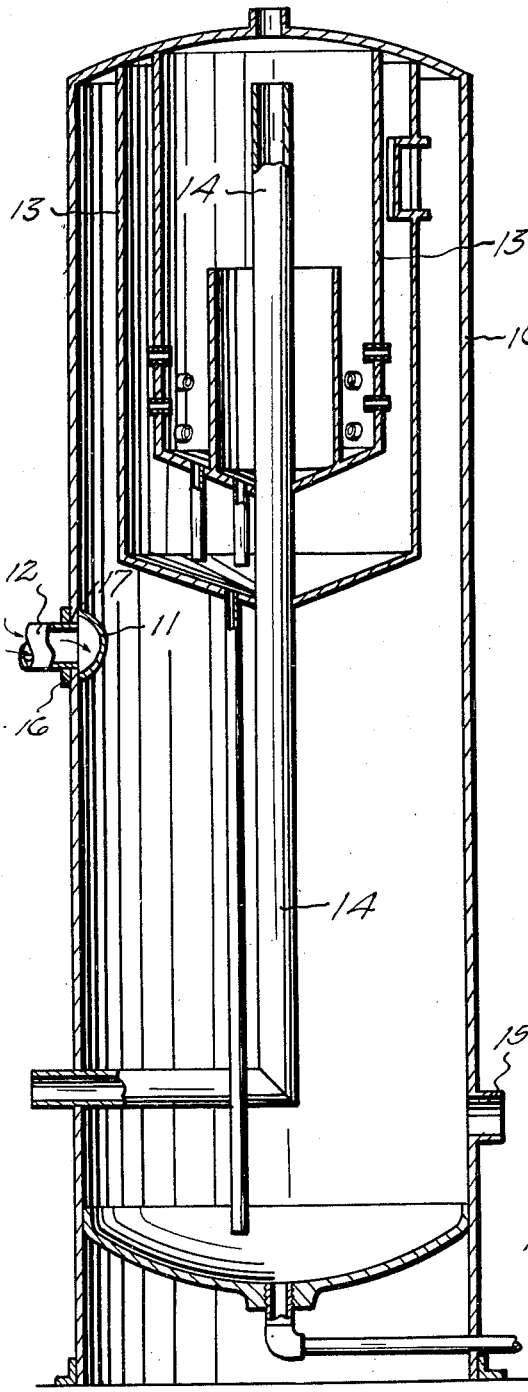
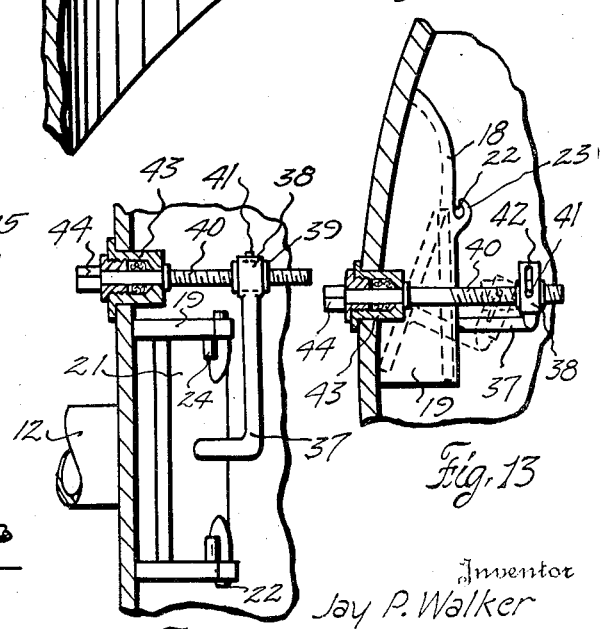
Inventor
Jay P. Walker Oct. 13, 1936.  J. P. WALKER  2,057,257
METHOD OF AND MEANS FOR SEPARATING FLUIDS
Filed Oct. 23, 1933  3 Sheets-Sheet 2

Inventor
Jay P. Walker
By Jack A. Ashley
Attorney

Oct. 13, 1936.   J. P. WALKER   2,057,257
METHOD OF AND MEANS FOR SEPARATING FLUIDS
Filed Oct. 23, 1933   3 Sheets-Sheet 3
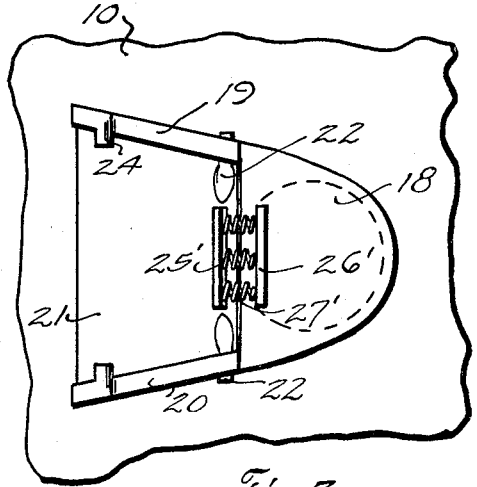
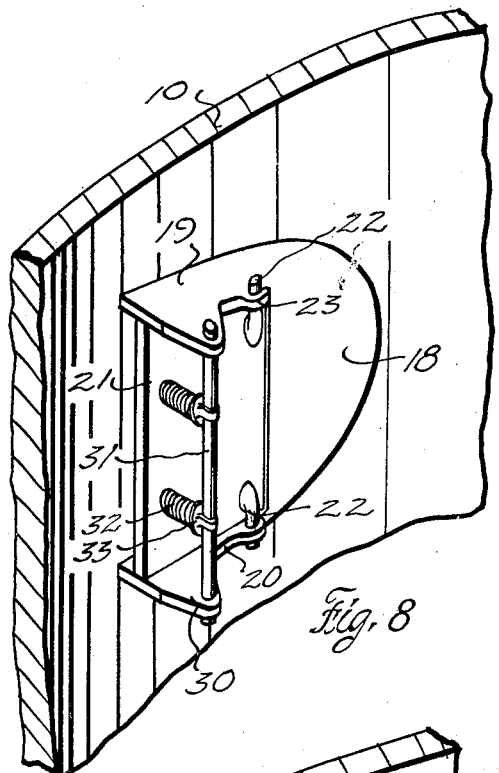
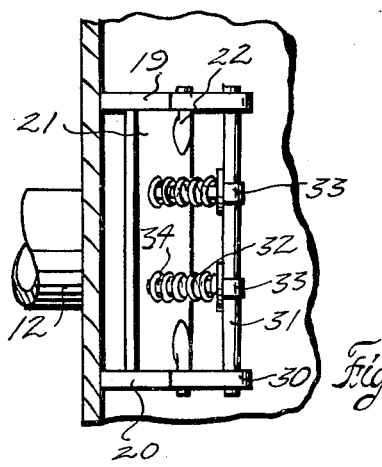
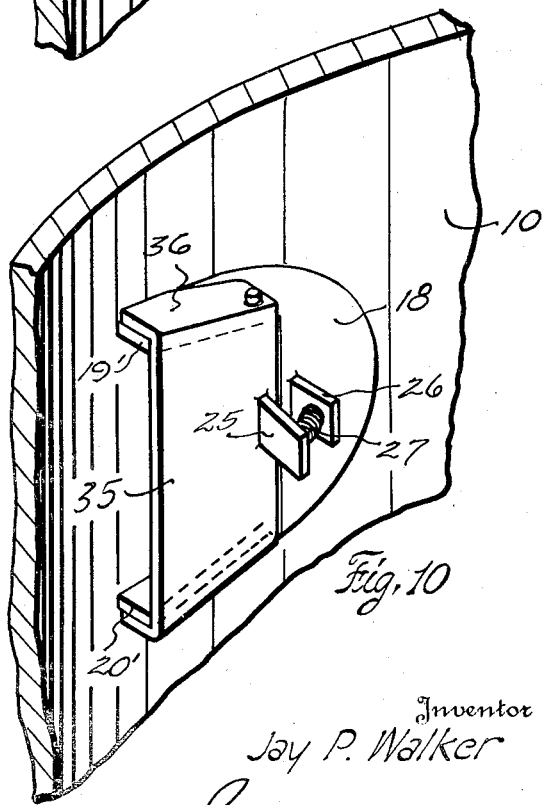
Inventor
Jay P. Walker
By Jack A. Ackley
Attorney Patented Oct. 13, 1936

2,057,257

UNITED STATES PATENT OFFICE 2,057,257

METHOD OF AND MEANS FOR SEPARATING FLUIDS

Jay P. Walker, Tulsa, Okla., assignor of forty per cent to Guy O. Marchant and six per cent to C. G. Wells, Tulsa, Okla.

Application October 23, 1933, Serial No. 694,808

10 Claims. (Cl. 183—2.7)

This invention relates to new and useful improvements in methods of and means for separating liquids and gases.

The invention has particularly to do with the separation of liquids and gases or the separation of fluids of different specific gravities.

It is well known that the most effective manner of separating gases from liquids, such as oil, or in separating fluids of different specific gravities, such as gaseous fluids of different grades, or oil and water, is to spread the mixture in a thin film or sheet on the wall of the separating tank and direct the same along said wall, whereby said spread mixture will be given sufficient travel to carry it along said wall and scrub out the gases and gaseous fluids.

The flow of oil, water and gas from a well varies, due to a number of conditions which it is not deemed necessary to discuss. A separator must be made to handle predetermined maximum quantities of liquid and gas per day. Where a separator is constructed with a capacity of 5,000 barrels of oil and five million cubic feet of gas per day, it would not be as effective in handling 100 barrels of oil and one million cubic feet of gas per day from the same well, unless its inlet was changed. If a diverter capable of handling the large load was used for handling the small load, the liquid and gas would not be spread as there would not be sufficient quantity to fill the diverter and cause the spread. As a result velocity would be lost and the liquids would merely flow down and out of the diverter, while the gas would roll out of the top of the diverter.

The foregoing would be due principally to the size of the discharge opening of the diverter, which opening, if made large enough to handle the capacity of the separator, would be too large to spread the smaller load. It is obvious that many variations would occur between the maximum and the minimum loads or flows and an ideal condition would obtain when the mixture was spread in a thin sheet at all variations. A method involving the spreading of the mixture on the wall of the tank in a thin sheet at all variations in flow would produce the most efficient separation.

One object of the invention is to provide a method whereby a mixture or influent is diverted from its flowing course and its impact rigidly sustained as it enters the separating tank and is diverted onto the inner surface of the wall of said tank, being at the same time spread in a vertical direction and controlled, whereby its spread is in a thin sheet regardless of fluctuations or variations in the input or flow of the mixture into the tank.

An important object of the invention is to provide a method and means whereby the velocity of the influent may be sufficiently slowed down, and its impact rigidly sustained to a point where the direction of flow of the influent can be changed, and then its spreading controlled by its volume rather than by its velocity, thus the desired thinness of its spread sheet being obtained.

Another object of the invention is to provide a method in which the influent mixture is automatically spread in a thin sheet on the inner surface of the wall of the separator, irrespective of the quantity of such mixture and also in which the particular quantity regulates the spread.

A further object of the invention is to provide means actuated by the flow of the influent mixture for automatically controlling the thickness of the sheet in which the mixture is spread.

Still another object of the invention is to provide a diverter having a variable discharge opening arranged to be adjusted by the flowing influent to vary its area in proportion to the quantity of mixture passing through the diverter, whereby a uniformally thin sheet is spread by the diverter irrespective of fluctuations in the flow.

A further object of the invention is to provide a diverter having an adjustable gate or valve arranged to regulate the size or area of the discharge opening of the diverter, whereby said area may be adjusted to the quantity of influent mixture passing through the diverter and a thin spread maintained.

A construction designed to carry out the invention will be hereinafter described, together with other features of the invention.

Figure 4:
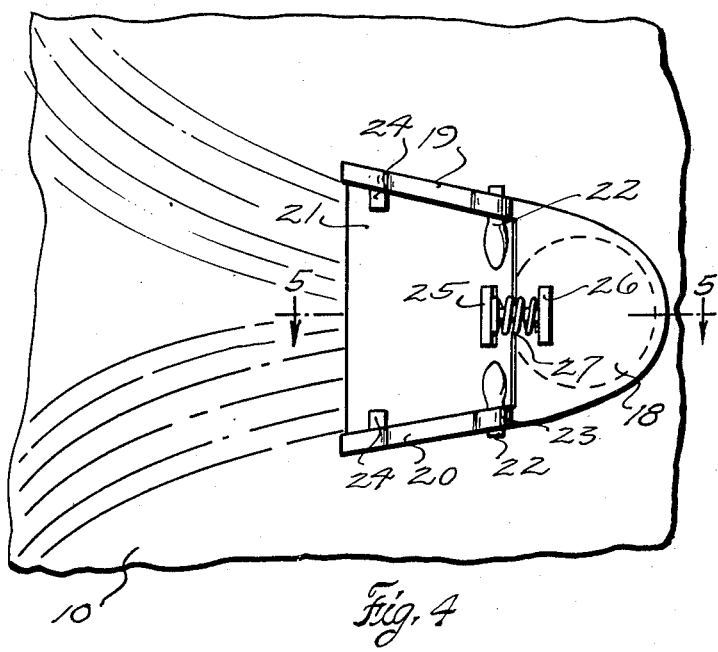
Figure 5:
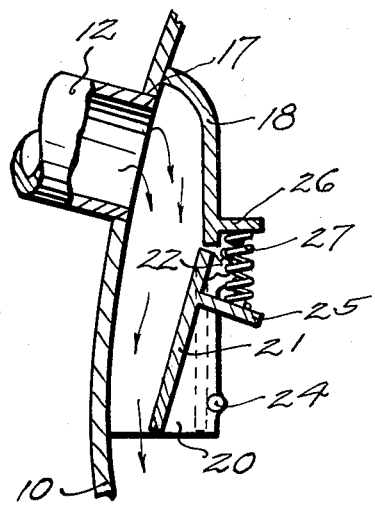
Figure 6:
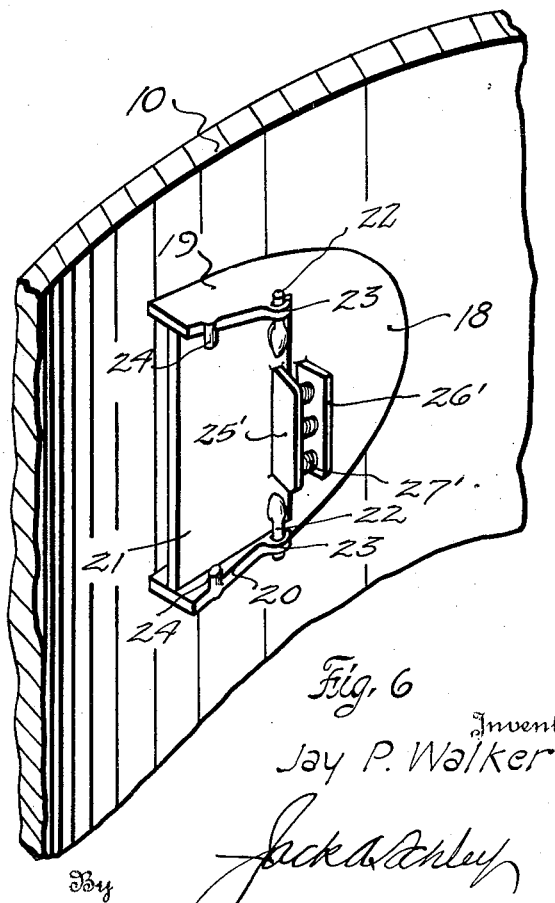

The invention will be more readily understood from a reading of the following specification and by reference to the accompanying drawings in which an example of the invention is shown, and wherein:

Figure 1 is a vertical sectional view of a separator equipped with a diverter constructed to carry out the invention, Figure 2 is an enlarged perspective view of said diverter mounted on a portion of the vertical wall of a separator, Figure 3 is a front elevation of the parts shown in Figure 2, Figure 4 is an elevation of the same, Figure 5 is a horizontal cross-sectional view taken on the line 5—5 of Figure 4, Figure 6 is a perspective view similar to Figure 2, showing another form of diverter, Figure 7 is an elevation of the parts shown in Figure 6, Figure 8 is a view similar to Figure 6, illustrating still another form, Figure 9 is a front view of the parts shown in Figure 8, Figure 10 is a view similar to Figure 8, showing another form of diverter, Figure 11 is a horizontal cross-sectional view of the same, Figure 12 is a front view partly in elevation and partly in section of a manually controlled diverter, and Figure 13 is a horizontal cross sectional view taken on the line 13—13 of Figure 12.

In the drawings the numeral 10 designates the wall or shell of a separator tank, such as is used for separating gas from oil, sometimes also from water. In carrying out the method a diverter 11 is employed and this diverter is connected with the inlet pipe 12, which in turn is connected with the well. The diverter may be mounted at any elevation according to the particular separator used; and while I have shown it in Figure 1 as located at mid-height, the invention is to be so limited. It is obvious that where the diverter is mounted midway the height of the tank, the lighter vapors and mists are given an opportunity to rise, while the liquids may flow circumferentially down the wall of the tank to the bottom thereof.

While this invention is in some respects an improvement upon my Letters Patent No. 1,823,301, issued September 15, 1931, it is not to be limited thereby or thereto. The method herein set forth involves arresting the influent as it enters the tank and diverting it onto the inner surface of the tank wall, so as to direct it circumferentially of the tank. The diverter 11, of course, has a discharge opening and this opening is arranged vertically so as to direct the discharge in a vertical sheet. Whether or not the constituents of the influent are segregated according to their specific gravities, while within the diverter, is not essential to this invention, and the degree of abruptness with which the influent is diverted onto the wall is not a cardinal point. The earlier the influent is diverted onto the wall, the longer its travel path will be.

The essential feature in the present method is the controlling of the discharge of liquids and fluids from the diverter in proportion to the quantity or volume of the influent flowing into said diverter, whereby these liquids and fluids will be spread in a thin sheet upon the inner surface of the tank wall. A diverter has been selected to illustrate the method, but the method does not depend upon the particular construction of the diverter, but is rather based on the diverting of the influent and maintaining a uniform thin spreading throughout variations and fluctuations in the quantity or volume of the influent.

In the upper portion of the tank 10, I have shown scrubbing baffles 13 with a gas escape pipe 14 leading therefrom. A liquid outlet 15 is shown at the lower portion of the tank. These parts are immaterial, because the invention may be applied to any type of separator and in some instances the baffles could be entirely omitted.

The well pipe 12 is usually connected to a collar 16 surrounding an opening 17 in the tank wall and the diverter is placed over this opening.

The diverter functions to arrest and turn the influent back into the inner surface of the wall of the tank and is provided with a curved hood 18 which surrounds and overhangs the opening 17. An upwardly flared wing 19 extends forwardly from the top of the hood, while a downwardly flared wing 20 extends forwardly from the bottom of the hood. The hood is merged into these wings so as to give a gradual flare or spread from the opening to the discharge end of the diverter. The parts 18, 19, and 20 constitute a body or hood shaped body.

A regulating or controlling gate 21 is hinged between the wings and extends substantially to the outer ends thereof to form a nozzle, whereby a vertically elongated discharge opening is provided. This gate may be constructed, hinged and actuated in various manners. In Figures 1 to 5 inclusive the gate is shown with trunnions 22 on its top and bottom and at its inner or rear end. These trunnions are located on the outer side of the gate so as to provide a smooth inner or under surface. Hooks 23 are formed on the wings for receiving the trunnions and are located so that the inner edge of the hinged end of the gate will not protrude inwardly beyond the inner surface of the hood 18 when the gate is swung, thus avoiding any obstruction to the flow of the influent, the gate, however, forming a deflector. Stops 24 on the outer ends of the wings overhang the gate and limit its outward swing.

The diverter may have the flare shown in Figure 4 or this flare may be reduced. The influent enters the tank opening 17 and the hood 18 in a more or less cylindrical stream and is immediately arrested, whereby the direction of flow of said stream and its shape is changed. The cross-sectional shape of the stream entering the diverter may be round, square or rectangular according to the shape of the opening 17 and the conductor leading thereto. The diverter having a much greater dimension vertically than transversely, will flatten out the stream as its direction of flow is changed and the general flare or vertical enlargement toward its discharge will cause a vertical spreading of the influent. The heavier constituents will tend to seek a lower level, while the lighter constituents will tend to attain a higher level. This may occur in the diverter or it may occur after the discharge of the influent therefrom, depending upon the volume and velocity of the influent entering the diverter.

In Figures 1 to 5 the gate is provided with a rigid arm 25 disposed adjacent its rear edge and approximately midway between the trunnions 22. A rigid bracket 26 is made integral with the hood, adjacent the gate and a coiled spring 27 therebetween, is supported by the arm and bracket. This spring is constantly under tension and extends to exert its force upon the arm, whereby the gate is swung toward the tank wall. Unless restrained by the escaping influent the spring will swing the forward end of the gate into contact with the inner surface of the tank wall, thus closing the nozzle. The spring may be left under such tension so as not to entirely close the gate. Any suitable means for swinging the gate may be employed.

When operating at full capacity the pressure exerted by the influent flowing through the diverter would overcome the tension of the spring 27 and swing the gate outwardly against the stops 24. The nozzle would thus be adjusted to its wide open position for discharging a maximum quantity of influent and spreading it in a thin vertical sheet on the wall of the tank, whereby it would be directed circumferentially and carried around said tank by its velocity. The spring and stops may be arranged so that the gate would not contact said stops when the influent reached its maximum.

If the volume of the influent flow from the well should drop, its flowing pressure will likewise drop, thus offering less resistance to the spring 27. Automatically the spring would swing the gate toward the back wall, thereby transversely contracting or reducing the area of the discharge opening. This reduction would be in proportion to the drop in the volume of influent and its flowing pressure. Obviously an increase in the volume and flowing pressure would swing the gate outwardly and proportionately increase the discharge area.

In Figures 6 and 7 a wider arm 25' is provided and the bracket 26' is made of similar width. Instead of a single spring, three springs 27' are supported between the arm and bracket. This structure may be employed for handling higher flowing pressures. The diverter is otherwise the same.

Figures 8 and 9 illustrate another form in which the stops 24 are omitted. Ears 30 are provided on the wings for rigidly supporting a vertical bar 31. Coiled springs 32 are equipped with caps 33 hinged on the bar. The inner or opposite ends of the springs engage over studs 34 on the gate adjacent its outer end. These springs are under sufficient tension to extend and swing the gate into contact with the tank wall and at the same time maintain their place on said gate. When the gate is swung to its outer or full open position the springs will be fully compressed thus acting as stops. In each of the forms shown in Figures 1 to 9 inclusive the hooks 23 are open toward the hood 18 and the springs act to hold the trunnions in said hooks.

The gate may be made in the form shown at 35 in Figures 10 and 11. This gate has inwardly directed flanges 36 engaging over the upper wing 19' and under the lower wing 20'. These wings are cut back from the surface of the hood 18 so as to permit the gate to lie substantially flush with said hood as is shown in Figure 11. The arm 25, bracket 26 and spring 27 of Figures 1 to 5 inclusive, are employed.

The wings are inclined toward their outer ends so that the gate will contact therealong when swung inwardly. In this form the closing of the gate is limited by the wings and the discharge opening cannot be entirely closed as in the other forms. Under some conditions it would not be desirable to have the gate close entirely and this form would be used.

In each of the forms illustrated the gate is automatically actuated by the influent and the springs. In some instances it might be desirable to manually adjust the gate and thus positively control its adjustment. In Figures 12 and 13 the gate 21 is provided with an angularly bent arm 37 having a laterally directed yoke 38 on its upper end receiving a nut 39 carried by a screw 40. The nut has guide pins 41 engaging slots 42 in the yoke. The screw is journaled in a stuffing box 43 provided in the tank wall above the wing 19. A wrench head 44 on the outer end of the screw is exposed outside of the tank. By placing a tool on the head 44 the gate may be adjusted to give the proper discharge opening for the influent.

The influent upon entering the hood 18 through the opening 17 from the well pipe 12, will be arrested in its flow and its direction of travel will be changed. The arresting may be gradual or merely a diversion whereby the direction of flow is gradually changed. The arresting and changing of flow direction may be sudden or pronounced. These actions together with the degree of abruptness of the arresting and directional change will depend upon the shape and length of the diverter. Obviously if the diverter is given a turtle-back shape and is comparatively short in length, the influent will be suddenly and more abruptly turned back upon the tank wall. If the length of the diverter is increased the directional change will not be so sudden and the point at which the diverted influent strikes the tank wall, will be further from the inlet opening 17. If the turtle-back is eliminated and the diverter made more flat the directional change will be elongated and variations in the length of the diverter will likewise have their effect. All of the foregoing is a matter of degree and mechanical design which is left to the engineering of the manufacturer and the particular flowing conditions encountered.

There is a constant effort upon the part of the constituents to segregate while flowing and this tendency is accentuated in the diverter, the extent or degree of segregation being controlled by the volume and velocity of the flowing fluids as well as by the shape, size, and area of the discharge opening of said diverter. If the volume of the influent is below the volumetric area of the discharge opening, it is obvious that the constituents will segregate within the diverter, whereby the liquids will seek a downward course and the gaseous fluids will seek an upward path. Such a segregation is not desirable and defeats separation by scrubbing or attrition.

By controlling segregation in the diverter ideal separation through scrubbing or attrition may follow. The flare of the diverter toward its discharge opening may be such as merely to spread the influent and not to induce segregation or it may be such as to induce sufficient segregation to start the constituents, while in said diverter, in their particular paths according to their specific gravities. Manifestly the influent will be spread through the diverter and it will be diverted onto the tank wall either within the diverter or upon discharging therefrom, depending upon the shape and length of said diverter. Whether the constituents are segregated or not within the diverter, they are diverted onto the wall at some point and started circumferentially along said wall, and most important of all they are spread in a comparatively thin vertical sheet. Even though the diverter was not flared the influent would still be diverted onto the tank wall and started to flow circumferentally around the tank wall.

The adjustable gate herein described or some means for accomplishing the same purpose is necessary to give the correct volumetric area to the discharge opening. With such regulation or control more effective separation may be carried out. As pointed out in my previous Patent (1,823,301) I do not depend upon centrifugal force to hold the influent upon the wall nor do I utilize centrifugal force to effect separation.

For this reason the principles employed in steam separators and some other separators, do not enter into my method of separation and would not be effective. The influent upon entering the tank is under more or less velocity and instead of merely directing this stream circumferentially within the tank and holding it on the surface by centrifugal force, I mechanically divert said influent onto the inner surface of the wall and spread it into a thin vertical sheet as it flows on said wall around the tank. Owing to its viscosity, the oil, and water to some extent, when spread, tends to adhere to the wall surface and its velocity and gravity are sufficient to carry it in a circuitous path along said tank wall. By this method the influent flowing around the wall does not lose its velocity as quickly as where it is merely introduced at tangent to the tank wall. The free gases are more quickly released and gases in solution are more thoroughly scrubbed out.

When the automatic gate as is shown in Figures 1 to 11 inclusive, is used, it will be closed (Figures 1 to 9) or swung to its minimum discharge area (Figures 10 and 11), when no fluid is flowing into the tank. As fluid flows into the tank from the pipe 12 through the opening 17 it will strike the hood 18, whereby its direction of flow will be changed and it will be diverted onto the tank wall as well as directed circumferentially of the tank. The forwardly flowing influent will press against the gate 21 and swing it outwardly. The opening of the gate will be resisted by the springs 27, 27', and 32 and thus the volumetric area of the discharge opening will be automatically regulated to and by the volume and velocity of the influent, so as to restrict the discharge to a comparatively thin sheet, as well as preventing such segregation in the diverter as would defeat separation because of non-spreading.

Where the gate 35 is used it will not be further opened until the volume exceeds its normal discharge-area capacity. The gate shown in Figures 12 and 13 may be adjusted to a closed position as is shown in dotted lines in Figure 13 or to any open position by turning the screw 40. Where the flow is more or less regular or where it drops off in regular cycles, this manually adjusted gate may be used to advantage. This form of gate may prove very effective where a separator is moved from one well to another.

What I claim and desire to secure by Letters Patent, is:

1. Means for separating flowing fluids comprising an upright tank having an inlet opening, a conductor for delivering mixed fluids to the opening of the tank, a diverter mounted entirely within the tank opposite and around the inlet and shaped for receiving the influent fluids and changing their flow to circumferential flow on the inner surface of the tank wall, and means connected with the end of the diverter within the tank for controlling the discharge of the fluids therefrom arranged to be operated by the fluids to spread said fluids in a vertical sheet on the tank wall, whereby said fluids are segregated according to their liquid content.

2. Means for separating flowing fluids comprising an upright tank having an inlet opening, a conductor for delivering mixed fluids to the opening of the tank, a diverter mounted entirely within the tank opposite and around the inlet and shaped for receiving the influent fluids and changing their flow to circumferential flow on the inner surfaces of the tank wall, means connected with the discharge end of the diverter for restricting the same and actuated by the flowing fluids to regulate the volumetric area of the discharge opening of the diverter in accordance with the volume and velocity of the flowing fluids, and means for resisting the actuation of said restricting means, whereby the fluids are spread in a vertical sheet on the tank wall and directed in circumferential paths around said tank to segregate the fluids according to their liquid content.

3. Means for separating flowing fluids comprising an upright tank having an inlet opening, a conductor for delivering mixed fluids to the opening of the tank, a stationary diverter mounted entirely within the tank opposite and surrounding the inlet and having an immovable upright wall shaped to receive the influent fluids and changing their flow to circumferential flow on the inner surface of the tank wall, the diverter being flared from its inlet to its outlet, movable means separate from the diverter and co-acting with the flare of the diverter for restricting the discharge area of said diverter and actuated by the flowing fluids to regulate the volumetric area of said discharge in accordance with the volume and velocity of said flowing fluids, means for resisting the actuation of said restricting means, whereby the fluids are spread in a vertical sheet on the tank wall, and directed in circumferential paths around said tank to segregate the fluids according to their liquid content.

4. The method of separating fluids flowing from a well which consists in conducting the stream of fluids from the well into an upright tank, abruptly changing the direction of flow of said stream immediately upon its entrance into the tank and diverting it onto the upright inner surface of the tank wall, and spreading said stream vertically in a thin sheet on the tank wall and at the same time resisting the diverted and spreading flow of the fluids within the tank in inverse proportion to their volume and velocity to control the spreading and to maintain the thinness of the spread stream.

5. A flow diverter for the inlet to a separator comprising, a rigid body having one side closed by an upright rigid wall and the other side open and adapted to be fastened to the inner surface of a tank wall around the inlet thereof, whereby the upright side is disposed opposite the tank inlet to receive the impact of the influent and to change its direction of flow, the body being closed at one end and having a discharge opening at its opposite end, and a gate hinged at the discharge opening of said body for controlling the discharge of the influent.

6. A flow diverter for the inlet to a separator comprising, a rigid body having one side closed by an upright rigid wall and the other side open and adapted to be fastened to the inner surface of a tank wall around the inlet thereof, whereby the upright side is disposed opposite the tank inlet to receive the impact of the influent and to change its direction of flow, the body being closed at one end and having a discharge opening at its opposite end, a gate hinged at the discharge opening of said body for controlling the discharge of the influent, and a spring opposing the opening of said gate, whereby resistance to the opening of said gate is increased as the pressure of the influent increases.

7. A flow diverter for the inlet to a separator including, a rigid body having an upright open side and the other side closed by an upright rigid wall, the top and bottom of the body being closed by elongated walls extending transversely from the closed side to the open side of said body, the elongated top and bottom walls of the body extending beyond one end of the rigid wall, and an upright gate hinged between the top and bottom walls and extending from the end of the rigid wall.

8. A flow diverter for the inlet to a separator including, a rigid body having an upright open side and the other side closed by an upright rigid wall, the top and bottom of the body being closed by elongated walls extending transversely from the closed side to the open side of said body, the elongated top and bottom walls of the body extending beyond one end of the rigid wall, an upright gate hinged between the top and bottom walls and extending from the end of the rigid wall, and spring means interposed between the rigid wall and the gate for swinging said gate toward the open side of said body.

9. The method of separating oil and gas mixtures flowing under pressure from a well in a stream which includes arresting the well stream as it comes from the well to slow down its velocity and at the same time changing its direction into a circumferential one, spreading the stream in an upright sheet while flowing it circumferentially, varying the transverse thickness of said sheet by resisting the flow thereof in proportion to the volume of the well stream, and increasing the resistance in a ratio to the increase in the volume of the flow of the well stream, whereby the stream is spread in a sheet of minimum thickness in proportion to its volume to obtain maximum primary separation.

10. The method of separating oil and gas mixtures flowing under pressure from a well in a stream which includes arresting the well stream as it comes from the well to slow down its velocity and at the same time changing its direction into a circumferential one, spreading the stream in an upright sheet while flowing it circumferentially, varying the transverse thickness of said sheet by resisting the flow thereof in proportion to the volume of the well stream, and increasing the resistance in a ratio to the increase in the volume of the flow of the well stream, whereby the stream is spread in a sheet of minimum thickness in proportion to its volume to obtain maximum primary separation, and flowing the gaseous fluids from the primary separation through a secondary separation to extract liquids therefrom.

JAY P. WALKER.

CERTIFICATE OF CORRECTION.

Patent No. 2,057,257.                                October 13, 1936.

JAY P. WALKER.

It is hereby certified that error appears in the printed specification of the above numbered patent requiring correction as follows: Page 2, first column, line 30, before the word "to" insert not; and that the said Letters Patent should be read with this correction therein that the same may conform to the record of the case in the Patent Office.

Signed and sealed this 1st day of December, A. D. 1936.

Henry Van Arsdale (Seal)                                      Acting Commissioner of Patents.